H. E. CLEMENT.
Meat-Tenderer.
No. 217,586.  Patented July 15, 1879.
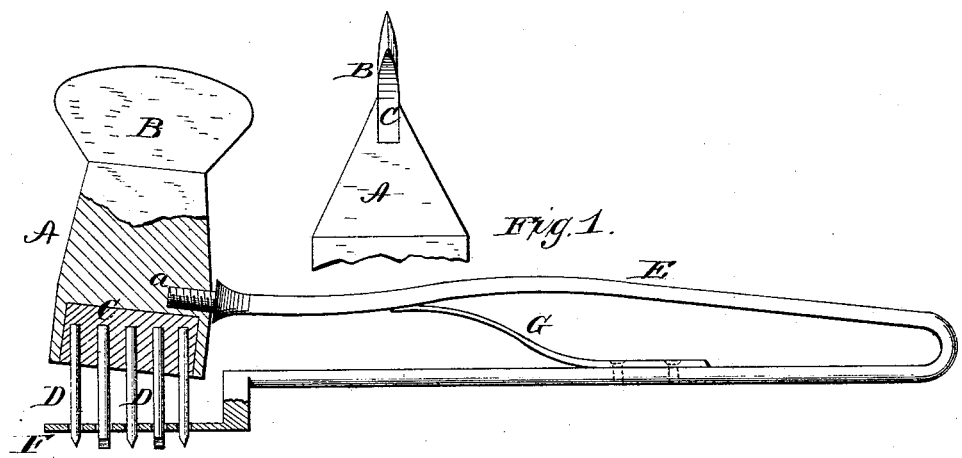
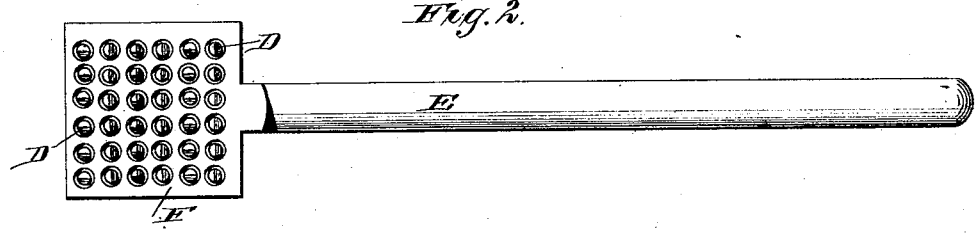
WITNESSES
Franck L. Ouraud
J. J. McCarthy
INVENTOR
Howard E. Clement
Alexander Mason
ATTORNEYS

UNITED STATES PATENT OFFICE.

HOWARD E. CLEMENT, OF SALEM COUNTY, NEW JERSEY.

IMPROVEMENT IN MEAT-TENDERERS.

Specification forming part of Letters Patent No. 217,586, dated July 15, 1879; application filed May 14, 1879.

*To all whom it may concern:*

Be it known that I, HOWARD E. CLEMENT, of the county of Salem, and in the State of New Jersey, have invented certain new and useful Improvements in Meat-Tenderers; and do hereby declare that the following is a full, clear, and exact description thereof, reference being had to the accompanying drawings, and to the letters of reference marked thereon, making a part of this specification.

The nature of my invention consists in the construction and arrangement of a machine for rendering meat tender, as will be hereinafter more fully set forth.

In order to enable others skilled in the art to which my invention appertains to make and use the same, I will now proceed to describe its construction and operation, referring to the annexed drawings, in which—

Figure 1 is a side view, partly in section, of my invention. Fig. 2 is a bottom view of the same.

A represents a metallic head of any suitable construction, but preferably made in the conical or pyramidal form shown in Fig. 1, and provided in its apex with a cutter or knife, B. This cutter or knife B has a shank, $b$, which is inserted in the head, and may be made dovetailed or otherwise, as desired.

In the bottom of the head A is made a suitable recess to receive a wooden bushing, C, in which are fastened a number of teeth, D. These teeth are made of round rods or wires, fastened in the wooden bushing, and having their ends beveled, and the teeth are set at varying angles—that is to say, the sharp cutting-edges are so set as to cut in every direction.

When necessary to sharpen the teeth or for other purposes, the wooden bushing C can be taken out and the teeth removed therefrom.

The head is screwed onto one end of the handle E, which, for that purpose, is formed with a screw, $a$, as shown.

The handle E is made of one piece of spring metal, bent in the center, so as to form two arms, running nearly parallel to each other, the screw $a$ being formed on the end of one arm, while on the end of the other arm is permanently attached, by welding or otherwise, a plate, F, which is perforated, and so arranged that the teeth D will project through the perforations.

A spring, G, is arranged between the two arms of the handle to keep the plate F in proper position.

In operation, the spring of the metal handle allows the plate F to yield, while the spring G throws it out again, so as to clear the meat from the teeth.

The clearing-plate F can be sprung off from the teeth, and the head may then be turned on the screw $a$, for removing the wooden bushing and teeth when required.

Having thus fully described my invention, what I claim as new, and desire to secure by Letters Patent, is—

1. In a meat-tenderer, the bent metallic spring-handle E, having the head with projecting teeth on one arm and the clearing-plate on the other arm, and a spring, G, arranged between the two arms, substantially as and for the purposes herein set forth.

2. The combination of the head A, cutter B, bushing C, teeth D, bent spring-handle E, with screw $a$, the perforated clearing-plate F, and the spring G, all constructed substantially as and for the purposes herein set forth.

In testimony that I claim the foregoing I have hereunto set my hand this 13th day of May, 1879.

HOWARD E. CLEMENT.

Witnesses:
 FRANCK L. OURAND,
 C. L. EVERT.